US009128246B2

United States Patent
Hafezi et al.

(10) Patent No.: US 9,128,246 B2
(45) Date of Patent: Sep. 8, 2015

(54) SYSTEMS, METHODS, AND DEVICES FOR OPTOMECHANICALLY INDUCED NON-RECIPROCITY

(71) Applicants: Mohammad Hafezi, Washington, DC (US); Peter Rabl, Innsbruck (AT)

(72) Inventors: Mohammad Hafezi, Washington, DC (US); Peter Rabl, Innsbruck (AT)

(73) Assignee: University of Maryland, College Park, College Park, MD (US)

( * ) Notice: Subject to any disclaimer, the term of this patent is extended or adjusted under 35 U.S.C. 154(b) by 430 days.

(21) Appl. No.: 13/654,262

(22) Filed: Oct. 17, 2012

(65) Prior Publication Data

US 2014/0140651 A1     May 22, 2014

Related U.S. Application Data

(60) Provisional application No. 61/548,074, filed on Oct. 17, 2011.

(51) Int. Cl.

| | |
|---|---|
| *G02F 1/025* | (2006.01) |
| *G02B 6/26* | (2006.01) |
| *G02F 1/01* | (2006.01) |
| *G02B 6/35* | (2006.01) |

(52) U.S. Cl.
CPC .............. *G02B 6/26* (2013.01); *G02F 1/0126* (2013.01); *G02F 1/0134* (2013.01); *G02B 6/3546* (2013.01); *G02F 2203/15* (2013.01)

(58) Field of Classification Search
CPC ....... G02F 1/011; G02F 2203/15; G02B 2/26; G02B 6/29335
See application file for complete search history.

(56) References Cited

U.S. PATENT DOCUMENTS

| | | | | |
|---|---|---|---|---|
| 4,720,160 | A  * | 1/1988 | Hicks, Jr. ........................ | 385/31 |
| 6,643,023 | B2 * | 11/2003 | Honda et al. .................. | 356/461 |
| 7,215,848 | B2 * | 5/2007 | Tan et al. ........................ | 385/32 |
| 8,472,808 | B2 * | 6/2013 | Roberts et al. ................ | 398/141 |
| 2004/0008948 | A1* | 1/2004 | Chin et al. ....................... | 385/50 |

(Continued)

OTHER PUBLICATIONS

Agarwal et al., "Electromagnetically induced transparency in mechanical effects of light," *Physical Review A*, 2010, 81(4): 041803.

(Continued)

*Primary Examiner* — Daniel Petkovsek
(74) *Attorney, Agent, or Firm* — Miles & Stockbridge P.C.; Frederick F. Rosenberger; Otilia Gabor (57) ABSTRACT

On-chip non-reciprocity can be achieved by employing micron-sized optomechanical (OM) devices that are fabricated on-chip and which can be integrated with other optical elements. Non-linear coupling between light and a mechanical mode inside a resonator can provide a non-reciprocal response of the OM system, which can be induced and fully controlled by an external driving electromagnetic field. By choosing different resonator and/or waveguide configurations and by tuning different system parameters, the same OM coupling mechanism can be used to provide isolation (e.g., as an optical diode), non-reciprocal phase shifting, and/or routing applications. Even in the presence of a finite intrinsic mode coupling inside the resonator, non-reciprocal effects remain large for a sufficiently strong OM coupling. The disclosed systems, methods, and devices can be applied on a single photon level, which may find use for various non-reciprocal applications in the classical optical as well as the quantum regime.

12 Claims, 5 Drawing Sheets

(56) References Cited

U.S. PATENT DOCUMENTS

2004/0126054 A1* 7/2004 Griffel ............................ 385/15
2010/0238536 A1* 9/2010 Hu et al. ....................... 359/280

OTHER PUBLICATIONS

Angelakis et al., "Photon-blockade-induced Mott transitions and XY spin models in coupled cavity arrays," *Physical Review A*, 2007, 76(3): 031805(R).

Aoki et al., "Observation of strong coupling between one atom and a monolithic microresonator," *Nature*, Oct. 2006, 443: pp. 671-674.

Baets et al., "Comment to 'Nonreciprocal Light Propagation in a Silicon Photonic Circuit'," Oct. 2011, arXiv:1110.2647v1 [physics.optics].

Brooks et al., "Ponderomotive light squeezing with atomic cavity optomechanics," Jul. 2011, arXiv:1107.5609v1 [quant-ph].

Carmon et al., "Modal Spectroscopy of Optoexcited Vibrations of a Micron-Scale On-Chip Resonator at Greater than 1 GHz Frequency," *Physical Review Letters*, Mar. 2007, 98(12): 123901.

Chan et al., "Laser cooling of a nanomechanical oscillator into its quantum ground state," *Nature*, Oct. 2011, 478: pp. 89-91.

Chang et al., "Slowing and stopping light using an optomechanical crystal array," *New Journal of Physics*, Feb. 2011, 13: pp. 1-26.

Ding et al., "High Frequency GaAs Nano-Optomechanical Disk Resonator," *Physical Review Letters*, Dec. 2010, 105(26): 263903.

Espinola et al., "Magneto-optical nonreciprocal phase shift in garnet/silicon-on-insulator waveguides," *Optics Letters*, May 2004, 29(9): pp. 941-943.\

Fabre et al., "Quantum-noise reduction using a cavity with a movable mirror," *Physical Review A*, Feb. 1994, 49(2): pp. 1337-1343.

Feng et al., "Nonreciprocal Light Propagation in a Silicon Photonic Circuit," *Science*, Aug. 2011, 333: pp. 729-733.

Fleischhauer et al., "Electromagnetically induced transparency: Optics in coherent media," *Reviews of Modern Physics*, Apr. 2005, 77(2): pp. 633-673.

Gallo et al., "All-optical diode in a periodically poled lithium niobate waveguide," *Applied Physics Letters*, Jul. 2001, 79(3): pp. 314-316.

Gardiner et al., "Input and output in damped quantum systems: Quantum stochastic differential equations and the master equation," *Physical Review A*, Jun. 1985, 31(6): pp. 3761-3774.

Greentree et al., "Quantum phase transitions of light," *Nature Physics*, Dec. 2006, 2: pp. 856-861.

Hafezi et al., "Robust optical delay lines with topological protection," *Nature Physics*, Aug. 2011, 7: pp. 907-912.

Haldane et al., "Possible Realization of Directional Optical Waveguides in Photonic Crystals with Broken Time-Reversal Symmetry," *Physical Review Letters*, Jan. 2008, 100(1): 013904.

Hartmann et al., "Strongly interacting polaritons in coupled arrays of cavities," *Nature Physics*, Dec. 2006, 2: pp. 849-855.

Kang et al., "Reconfigurable light-driven opto-acoustic isolators in photonic crystal fibre," *Nature Photonics*, Sep. 2011, 5: pp. 549-553.

Kippenberg et al., "Modal coupling in traveling-wave resonators," *Optics Letters*, Oct. 2002, 27(19): pp. 1669-1671.

Koch et al., "Time-reversal-symmetry breaking in circuit-QED-based photon lattices," *Physical Review A*, 2010, 82(4): 043811.

Levy, M., "Nanomagnetic route to bias-magnet-free, on-chip Faraday rotators," *Journal of the Optical Society of America*, Jan. 2005, 22(1): pp. 254-260.

Mancini et al., "Quantum noise reduction by radiation pressure," *Physical Review A*, May 1994, 49(5): pp. 4055-4065.

Manipatruni et al., "Optical Nonreciprocity in Optomechanical Structures," *Physical Review Letters*, May 2009, 102(21): 213903.

Marquardt et al., "Quantum Theory of Cavity-Assisted Sideband Cooling of Mechanical Motion," *Physical Review Letters*, Aug. 2007, 99(9): 093902.

Matthews et al., "Manipulation of multiphoton entanglement in waveguide quantum circuits," *Nature Photonics*, Jun. 2009, 3: pp. 346-350.

Mazzei et al., "Controlled Coupling of Counterpropagating Whispering-Gallery Modes by a Single Rayleigh Scatterer: A Classical Problem in a Quantum Optical Light," *Physical Review Letters*, Oct. 2007, 99(17): 173603.

O'Brien et al., "Photonic quantum technologies," *Nature Photonics*, Dec. 2009, 3: pp. 687-695.

Politi et al., "Shor's Quantum Factoring Algorithm on a Photonic Chip," *Science*, Sep. 2009, 325: p. 1221.

Potton, R.J., "Reciprocity in optics," *Reports on Progress in Physics*, Institute of Physics Publishing, 2004, 67: pp. 717-754.

Rabl, P., "Photon Blockade Effect in Optomechanical Systems," *Physical Review Letters*, Aug. 2011, 107(6): 063601.

Safavi-Naeini et al., "Electromagnetically induced transparency and slow light with optomechanics," *Nature*, Apr. 2011, 472: pp. 69-73.

Sansoni et al., "Polarization Entangled State Measurement on a Chip," *Physical Review Letters*, Nov. 2010, 105(20): 200503.

Schliesser et al., "Cavity optomechanics with whispering-gallery mode optical micro-resonators," Mar. 2010, arXiv:1003.5922v1 [quant-ph].

Soljacic et al., "Nonlinear photonic crystal microdevices for optical integration," *Optics Letters*, Apr. 2003, 28(8): pp. 637-639.

Stannigel et al., "Optomechanical Transducers for Long-Distance Quantum Communication," *Physical Review Letters*, Nov. 2010, 105(22): 220501.

Stannigel et al., "Optomechanical transducers for quantum-information processing," *Physical Review A*, 2011, 84(4): 042341.

Umucalilar et al., "Artificial gauge field for photons in coupled cavity arrays," *Physical Review A*, 2011, 84(4): 043804.

Verhagen et al., "Quantum-coherent coupling of a mechanical oscillator to an optical cavity mode," *Nature*, Feb. 2012, 482: pp. 63-67.

Wang et al., "Observation of unidirectional backscattering-immune topological electromagnetic states," *Nature*, Oct. 2009, 461: pp. 772-776.

Wang et al., "Reflection-Free One-Way Edge Modes in a Gyromagnetic Photonic Crystal," *Physical Review Letters*, Jan. 2008, 100(1): 013905.

Weis et al., "Optomechanically Induced Transparency," *Science*, Dec. 2010, 330: pp. 1520-1523.

Wilson-Rae et al., "Theory of Ground State Cooling of a Mechanical Oscillator Using Dynamical Backaction," *Physical Review Letters*, Aug. 2007, 99(9): 093901.

Yu et al., "Complete optical isolation created by indirect interband photonic transitions," *Nature Photonics*, Feb. 2009, 3: pp. 91-94.

Zaman et al., "Faraday rotation in an InP waveguide," *Applied Physics Letters*, 2007, 90(2): 023514.

* cited by examiner

SYSTEMS, METHODS, AND DEVICES FOR OPTOMECHANICALLY INDUCED NON-RECIPROCITY

CROSS-REFERENCE TO RELATED APPLICATIONS

The present application claims the benefit of U.S. Provisional Application No. 61/548,074, filed Oct. 17, 2011, which is hereby incorporated by reference herein in its entirety.

STATEMENT REGARDING FEDERALLY SPONSORED RESEARCH

The present invention was made with U.S. Government support under grant/contract no. W911NF0910406 awarded by U.S. Army Research Office (ARO). The U.S. Government has certain rights in the invention.

FIELD

The present disclosure relates generally to electromagnetic systems, and, more particularly, to systems, methods, and devices for optomechanically inducing non-reciprocity for control of propagating electromagnetic fields in waveguides.

BACKGROUND

The field of integrated photonic circuits seeks to create micron-scale photonic elements and to integrate these elements into a single chip-based device. A remaining challenge in integrated photonic circuits is on-chip optical isolation, i.e., the filtering of photons propagating in different directions within the photonic circuit. This challenge can be characterized by the more general goal of providing of non-reciprocal optical elements that can be integrated on-chip (i.e., on a micrometer scale).

Optical isolation can be achieved through the use of magneto-optical properties (e.g., Faraday rotation). However, such an implementation requires large magnetic fields and thus is not amenable for integration on the small scale. Non-magnetic approaches can rely on a dynamical modulation of the index of refraction and/or stimulated inter-polarization scattering based on opto-acoustic effects, modulated dielectric constants and/or optical non-linearities that lead to an intensity dependent isolation.

Such optical isolation schemes may be suitable for certain application. For example, for many commercial applications, high bandwidth and robust fabrication techniques are key requirements. However, requirements can be different in other applications. For example, in on-chip quantum computing, quantum simulation schemes, or quantum Hall physics experiments, it may be desirable to employ optical isolation schemes that provide low losses, operation on a single photon level and the ability to implement coherent non-reciprocal phase shifters, as well as on-chip integration. Many of the above noted optical isolation schemes cannot be easily integrated on chip, while others do not break the time reversal symmetry and therefore, are not suitable for non-reciprocal robust waveguides, or the emulation of real magnetic fields for light.

SUMMARY

On-chip non-reciprocity can be achieved by employing micron-sized optomechanical (OM) devices that are fabricated on-chip and which can be integrated with other optical elements. Non-linear coupling between light and a mechanical mode inside a resonator (e.g., a micro-ring resonator) can provide a non-reciprocal response of the OM system, which can be induced and fully controlled by an external driving field. By choosing different resonator and waveguide configurations and tuning different system parameters, the same OM coupling mechanism can be used to provide isolation (e.g., as an optical diode), non-reciprocal phase shifting, and/or routing applications. Even in the presence of a finite intrinsic mode coupling inside the resonator, non-reciprocal effects remain large for a sufficiently strong OM coupling. The disclosed systems, methods, and devices can be applied on a single photon level, which may find use for various non-reciprocal applications in the classical optical as well as the quantum regime.

In embodiments, a method of non-reciprocal operation of a resonator system can include pumping a resonator with a pumping electromagnetic field in one of a clockwise direction and a counter-clockwise direction of the resonator so as to enhance an optomechanical coupling of the resonator, the resonator having an intrinsic loss, $\kappa_{in}$. The method can further include, at a same time as the pumping, propagating a first input electromagnetic field along a waveguide in a first longitudinal direction thereof. The waveguide can be coupled to the resonator such that electromagnetic fields propagating in the waveguide interact with the resonator. The coupling between the waveguide and the resonator can be given by $\kappa$. The coupling $\kappa$ and the intrinsic loss $\kappa_{in}$ can be such that interaction between the pumping electromagnetic field and the resonator alters the propagation of the first input electromagnetic field in the first longitudinal direction differently than that of a second input electromagnetic field traveling in an opposite longitudinal direction along said waveguide.

For example, when $\kappa$ is substantially equal to $\kappa_{in}$, the first input electromagnetic field propagating in the waveguide can be completely attenuated by the interaction with the resonator while the second input electromagnetic field propagating in the waveguide can be substantially unaffected by the interaction with the resonator. In another example, when $\kappa$ is much greater than $\kappa_{in}$, the first and second input electromagnetic fields propagating in the waveguide can be phase-shifted by different amounts by the respective interactions with the resonator.

In embodiments, a non-reciprocal resonator system can include a resonator, a waveguide, and a pumping source. The resonator can have an intrinsic loss $\kappa_{in}$, and the waveguide can be coupled to the resonator such that electromagnetic fields propagating therein interact with the resonator. The coupling between the waveguide and the resonator can be given by $\kappa$. The pumping source can supply a pumping electromagnetic field to the resonator in one of a clockwise direction and a counter-clockwise direction of the resonator so as to enhance an optomechanical coupling of the resonator. The coupling $\kappa$ can be either substantially equal to or greater than the intrinsic loss $\kappa_{in}$.

For example, when $\kappa$ is substantially equal to $\kappa_{in}$, the resonator system can be configured to function as an optical diode for electromagnetic fields propagating along the waveguide when the resonator is pumped by the pumping source. In another example, when $\kappa$ is much greater than $\kappa_{in}$, the resonator system is configured to function as a non-reciprocal phase shifter for electromagnetic fields propagating along the waveguide when the resonator is pumped by the pumping source.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

In embodiments of the disclosed subject matter, optomechanics are used to induce non-reciprocity in the optical domain, for example, for use as an optical isolator, non-reciprocal phase shifter, or photon router. In one or more embodiments, an optomechanical (OM) resonator coupled to a waveguide induces a non-reciprocal phase in the under-coupled regime ($\kappa_{in} \ll \kappa$) and forms an optical isolator in the critically coupled regime ($\kappa \approx \kappa_{in}$). An optical system comprising the waveguide, OM micro-ring resonator, and additional optical elements (e.g., laser light sources) can be integrated on-chip. The bandwidth of such a device may be limited by the amount of pump power that the resonator can tolerate before nonlinear effects become significant. For example, the bandwidths may be in the few MHz regime, although other bandwidths may be possible with optimized OM system designs.

Embodiments of the disclosed subject matter allow the implementation of coherent non-reciprocal phase shifts, operation on the single photon level, and the ability to dynamically control non-reciprocal effects by tuning the power of the pump beam for the micro-ring resonator. For example, a 2-D array of optical micro-ring resonators can be connected to each other via OM systems configured as non-reciprocal phase shifters. If the phase-shifts are chosen appropriately (e.g., according to the Landau gauge), then a tight-binding model of photons with an effective magnetic field can be simulated. In other words, quantum Hall physics can be simulated with photons where the time-reversal symmetry is broken. Moreover, embodiments of the disclosed subject matter can be combined with single photon non-linearities that could be either induced by the intrinsic non-linearity of the OM interaction itself or by interfacing the OM system with other atomic or solid state qubits. Combined with such strong interaction between photons, the implementation of magnetic Hamiltonians using micron-sized OM elements could pave the way for the exploration of fractional quantum Hall physics and various other exotic states of light.

Figure 1:
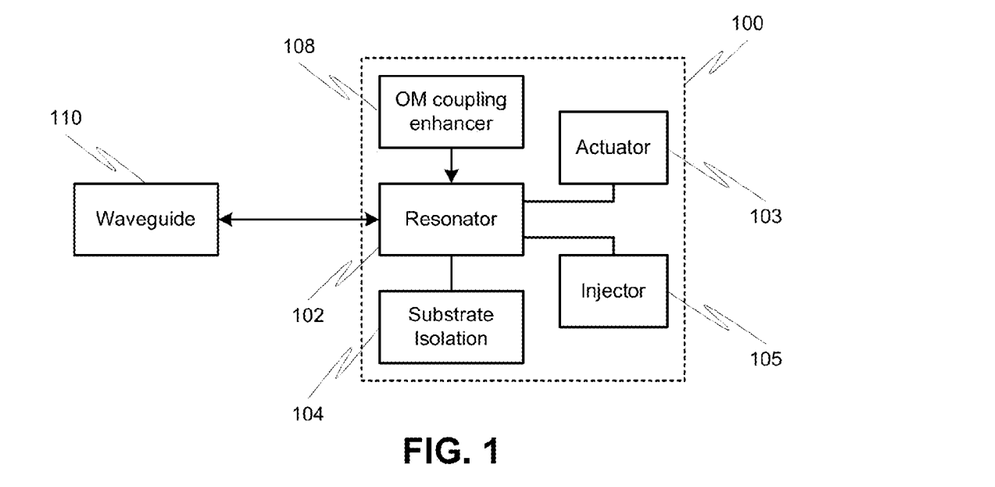
FIG. 1 is a diagram illustrating components of an optomechanical system for inducing non-reciprocity, according to one or more embodiments of the disclosed subject matter.

Referring to FIG. 1, a simplified diagram of an OM system 100 according to embodiments of the disclosed subject matter is shown. Within system 100 is a resonator 102, for example a toroidal micro-ring resonator, which is supported on-chip in a mechanically isolated position by isolator 104. Isolator 104 can be a pedestal or pillar that effectively isolates the resonator 102 from phonons in the substrate that may interfere with system operation by generating noise. One or more input-output waveguides 110 can provide input fields to the resonator 102 and receive fields from the resonator 102. For example, the input-output waveguide 110 can be an optical waveguide (e.g., optical fiber, photonic crystal, or any other waveguide) that is side-coupled to the ring resonator 102. Light provided to the resonator 102 via the waveguide 110 can be at or near the optical resonant frequency of the resonator 102.

System 100 further includes a mechanism 108 for enhancing OM coupling between the input electromagnetic fields and the resonator 102. For example, laser pumping of the resonator 102 can serve as the enhancing mechanism 108. Pumping may be achieved via the same input-output waveguide 110 (e.g., by sharing the same waveguide as the input fields) or via a separate input-output waveguide (e.g., by a separate waveguide also side-coupled to the ring resonator 102). As explained in further detail below, the combination of OM coupling enhancement via electromagnetic field pumping of the resonator together with the selection of waveguide-resonator coupling and resonator intrinsic loss values enables the system 100 to selectively act as a non-reciprocal element, in particular, an optical diode or a non-reciprocal phase shifter. The system 100 can also revert to a standard all-pass or notch filter when no OM coupling enhancement is present (e.g., when the pumping is turned off).

The waveguide-resonator coupling (i.e., $\kappa$) is a function of the distance between the resonator 102 and the waveguide 110. To alter the coupling $\kappa$, the system 100 can include, for example, an actuator 103 that dynamically adjusts the gap between the resonator and the waveguide. Although shown in FIG. 1 as acting on the resonator 102, it is also contemplated that the actuator 103 can act on just the waveguide 110 or on both the waveguide 110 and the resonator 102 to affect the desired change in the coupling κ. Alternatively, the waveguide-resonator spatial relationship may be fixed (and thereby the coupling κ fixed) and only the intrinsic loss adjusted. The intrinsic loss of the resonator (i.e., $\kappa_{in}$) is a function of the material of the resonator and can be, for example, on the order of 10 MHz. However, the intrinsic loss can be artificially increased by making carriers in the resonator. Thus, system 100 may also include an injection device 105, which is configured to dynamically adjust the intrinsic loss of the resonator 102 by making or injecting carriers therein. In some embodiments, both the waveguide-resonator coupling κ and the intrinsic loss $\kappa_{in}$ can be dynamically adjusted.

Using one or more of the actuator 103 and the injection device 105 in combination with the OM coupling enhancer 108, the system 100 can be caused to switch between an optical isolator function (i.e., when $\kappa_{in} \approx \kappa$), a non-reciprocal phase shifting function (i.e., when $\kappa_{in} \ll \kappa$), and an all-pass function (i.e., when no pumping of the resonator 102 is present). A controller (not shown) or other on-chip or off-chip circuitry can be provided to control various aspects of system 100 including, but not limited to, pump power, pump direction, and pump timing, as well as control of the waveguide-resonator coupling (via control of actuator 103) and/or resonator intrinsic loss (via control of injector 105). In still another alternative, both the coupling κ and the intrinsic loss $\kappa_{in}$ may be fixed such that the system 100 acts in a particular manner (e.g., as optical diode or non-reciprocal phase shifter) during OM coupling enhancement.

When operated as an optical isolator, the OM system can have a waveguide-resonator coupling κ approximately equal to the intrinsic loss $\kappa_{in}$, which may be on the order of 10 MHz, for example. When operated as a non-reciprocal phase shifter, the OM system can have a waveguide-resonator coupling κ greater than the intrinsic loss $\kappa_{in}$, for example at least an order of magnitude greater than $\kappa_{in}$.

A practical system may include a plurality of the individual non-reciprocal system 100 on-chip. Various waveguides may connect the individual systems 100 to each other as well as to other optical elements on or off chip. In general, a practical system can take advantage of the non-reciprocity offered by the individual systems 100 for optical processing and routing. For example, some of the systems 100 can be configured to function as add-drop components for routing input fields or photons along different waveguides in the chip. Various combinations and configurations of optical circuits are enabled by the use of the disclosed non-reciprocal systems.

Figure 2A:
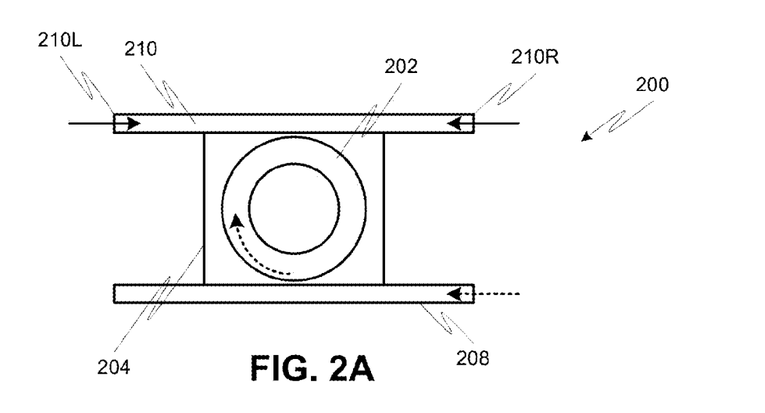
FIGS. 2A-2B show plan and cross-sectional views, respectively, of a micro-ring resonator and waveguide, according to one or more embodiments of the disclosed subject matter.
Figure 2B:
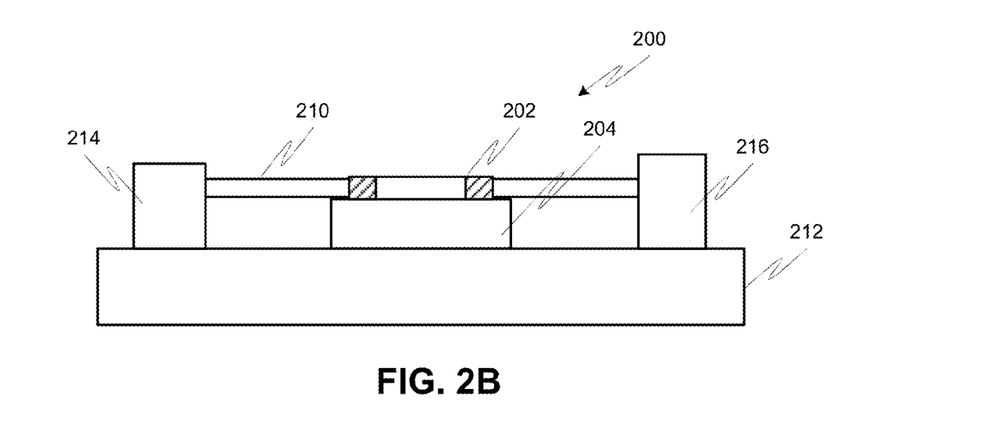

Referring to FIGS. 2A-2B, components of an example OM system 200 are shown. Note that in FIG. 2A, some of the components on the substrate 212, which are illustrated in FIG. 2B, have not been shown for clarity. A micro-ring resonator 202 can be provided on pillar 204 so as to isolate the resonator 202 from vibrations and phonons of substrate 212. At least one waveguide 210 can be side-coupled to the resonator 202 to provide input optical fields to the resonator 202. In particular, the waveguide 210 may have a left-side 210L via which right-moving optical fields are introduced and a right-side 210R via which left-moving optical fields are introduced. A pumping field for the resonator 202 may also be introduced via waveguide 210. Alternatively or additionally, one or more separate waveguides 208 can be side-coupled to the resonator 202 for introducing the pumping field thereto. The direction of the pumping field may determine the direction of non-reciprocity in the resonator 202. For example, whether the left-moving optical field or the right-moving optical field is attenuated or changed by the resonator depends on the direction of propagation of the pumping field around the resonator 202. Operation of the non-reciprocal features of the OM system 200 will be discussed in further detail below.

OM system 200 can be integrated on-chip (i.e., mounted on substrate 212) with other optical components. For example, waveguide 210 may be connected to an optical source 214 (e.g., a laser diode) and/or an optical detector 216 (e.g., a photodiode). Other optical components and configurations are also possible according to one or more contemplated embodiments. The OM system 200 as well as other components on substrate 212 can be composed of materials typically employed in the optical and semiconductor fields, such as, but not limited to gallium arsenide (GaAs), silicon (Si), and silicon oxide ($SiO_2$).

Figure 3:
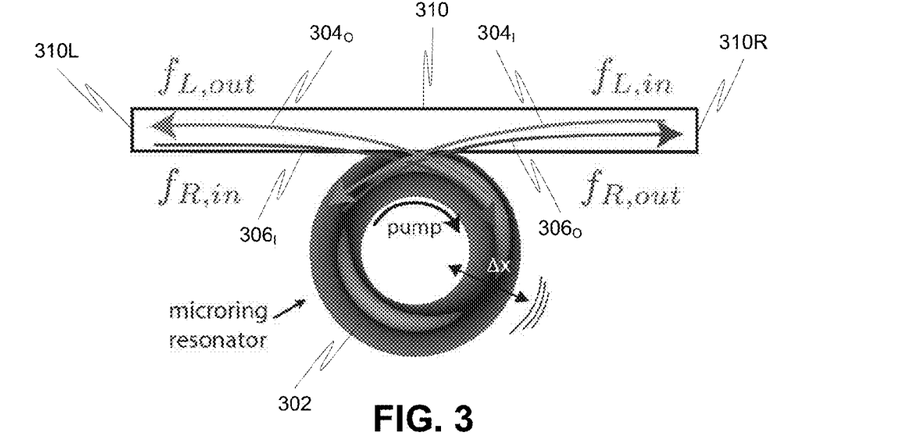
FIG. 3 illustrates aspects of optomechanically induced non-reciprocity of a micro-ring resonator in the presence of a strong pump field and right-moving and left-moving fields, according to one or more embodiments of the disclosed subject matter.

FIG. 3 shows aspects of a micro-ring resonator 302 in an idealized and simplified setting for discussion of OM induced non-reciprocity. In particular, an OM ring resonator 302 (e.g., a toroidal microresonator) can be side-coupled to a waveguide 310. This configuration is commonly referred to as an all-pass filter (APF) or notch filter. The ring resonator 302 supports two degenerate right- and left-circulating optical modes with frequency $\omega_C$ and bosonic operators $a_R$ and $a_L$ respectively. Radial vibrations of the resonator lead to a modulation of $\omega_C$ which can be modeled by the standard OM Hamiltonian ($\hbar = 1$), $$H_{om} = \omega_m b^\dagger b + \sum_{i=L,R} \omega_c a_i^\dagger a_i + g_0 a_i^\dagger a_i (b^\dagger + b) \quad (1)$$

where $\omega_m$ is the frequency of the mechanical mode, b is the bosonic operator for the mechanical mode of frequency $\omega_m$, $g_0$ is the OM coupling, which corresponds to the optical frequency shift per quantum of motion.

Note that the mechanical mode is extended and varies slowly over the scale of the optical wavelength. Therefore, the optomechanical coupling does not induce a mixing between the right- and left-circulating optical modes. Typically, $g_0$ is very weak. To enhance OM interactions, the right-circulating resonator mode (or the left-circulating resonator mode, depending on desired effects) can be excited by an external laser field of frequency $\omega_L = \omega_C + \Delta$. In the limit $|\alpha_R| \gg 1$, where $\alpha_R$ is the classical field amplitude of the driven mode, a unitary transformation $a_R \rightarrow a_R + \alpha_R$ can be made and the OM coupling can be linearized around $\alpha_R$. As a result, an effective Hamiltonian which in the frame rotating with $\omega_L$ is given by:

$$H_{om-lin} = -\Delta(a_R^\dagger a_R + a_L^\dagger a_L) + \omega_m b^\dagger b + (G_R a_R^\dagger + G_R^* a_R)(b^\dagger + b) \quad (2)$$

where the enhanced OM coupling $G_R = g_0 \alpha_R$, and an additional OM frequency shift has been reabsorbed into the definition of Δ.

In view of $|G_R| \gg g_0$, neglected residual OM interactions ~ $\vartheta(g_0)$. The external driving field creates an asymmetry between left- and right-circulating modes, which can be exploited for generating non-reciprocal effects. The strong pump field (e.g., 308) thus enhances the OM coupling between an isolated vibrational mode and the right-circulating optical mode inside the ring resonator 302. This results in different transmission properties for right-moving fields 306 and left-moving fields 304 in the waveguide 310. Note that the right-moving field 306 enters at the left side 310L of the waveguide as $306_I$ to interact with the resonator 302 and may leave the right side 310R of the waveguide as 306$_O$, depending on the effect of the resonator 302. Similarly, the left-moving field 304 enters at the right side 310R of the waveguide as 304$_I$ to interact with the resonator 302 and may leave the left side 310L of the waveguide as 304$_O$, depending on the effect of the resonator 302.

For both propagation directions, input fields (e.g., 304$_I$, 306$_I$) and outgoing fields (e.g., 304$_O$, 306$_O$) can be related by:

$$f_{R/L,out}(t) = f_{R/L,in}(t) + \sqrt{2\kappa}\, a_{R/L}(t) \tag{3}$$

where $2\kappa$ is the resonator decay rate into the waveguide.

After Eq. (2), the equations of motion take the following form:

$$\dot{a}_R = (i\Delta - \kappa_{in} - \kappa) a_R - i G_R (b + b^\dagger) - \sqrt{2\kappa}\, f_{R,in} \tag{4}$$

$$\dot{a}_L = (i\Delta - \kappa_{in} - \kappa) a_L - \sqrt{2\kappa}\, f_{L,in} \tag{5}$$

$$\dot{b} = (-i\omega_m - \gamma_m) b - i G_R^* a_R - i G_R a_R^\dagger \tag{6}$$

where $2\kappa_{in}$ denotes the intrinsic photon loss rate of the optical resonator, and $\gamma_m$ is the mechanical damping rate.

Due to the linearity of the above equations, they can be solved for the exception values, in frequency space. In the following, of primary interest is the case where the resonator is driven at or close to the mechanical red sideband (i.e., where $\Delta \approx -\omega_m$), and only $a^\dagger b + a b^\dagger$ terms in Eq. (2) will be resonant. Therefore, in the sense of a rotating wave approximation, other off-resonant contributions in Eq. (2) can be ignored. Such an approximation is justified, as described herein below. Moreover, it allows the description of the transport properties of the systems in terms of a simple 2×2 scattering matrix:

$$\begin{pmatrix} f_{R,out}(\delta) \\ f_{L,out}(\delta) \end{pmatrix} = \begin{pmatrix} t_R(\delta) & r_L(\delta) \\ r_R(\delta) & t_L(\delta) \end{pmatrix} \begin{pmatrix} f_{R,in}(\delta) \\ f_{L,in}(\delta) \end{pmatrix} \tag{7}$$

where $\delta = \omega + \Delta$ is the detuning of the incoming field from the optical resonator resonance.

For the idealized model, there is no scattering between left-moving mode (e.g., 304) and the right-moving mode (e.g., 306) and $r_R = r_L = 0$. In turn, the transmission coefficients are given by:

$$t_L = \frac{\kappa_{in} - \kappa - i\delta}{\kappa_{in} + \kappa - i\delta}, \tag{8}$$

$$t_R = 1 - \frac{2\left(\frac{\gamma_m}{2} - i\delta\right)\kappa}{|G_R|^2 + \left(\frac{\gamma_m}{2} - i\delta\right)(\kappa + \kappa_{in} - i\delta)}$$

The transmission spectrum of the left-going field (e.g., 304) is simply that of a bare resonator, while the transmission of the right-going mode (e.g., 306) is modified by the presence of the mechanical oscillator. In particular, the expression for $t_R$ resembles that of electromagnetically induced transparency (EIT), if $G_R$ is assumed to be the "control field." As in atomic EIT, the coupling of the light field to the long-lived mechanical mode (i.e., $\gamma_m \ll \kappa$) leads to a dip in the weak coupling limit and to a splitting of the transmission resonance in the strong coupling regime. Such a feature can be used for slowing and stopping of light using OM systems as well as for achieving non-reciprocity for optical isolation, non-reciprocal phase shifting, or any other purpose.

In an embodiment of the OM system as an optical isolator, the system can be constructed such that the ring resonator is critically coupled, i.e., where $\kappa_{in} = \kappa$. Thus, for frequencies around the ring optical resonance (i.e., $\delta \approx 0$):

$$\begin{pmatrix} f_{R,out}(\delta) \\ f_{L,out}(\delta) \end{pmatrix} \approx \begin{pmatrix} 1 & 0 \\ 0 & 1 \end{pmatrix} \begin{pmatrix} f_{R,in}(\delta) \\ f_{L,in}(\delta) \end{pmatrix} \tag{9}$$

Figure 4A:
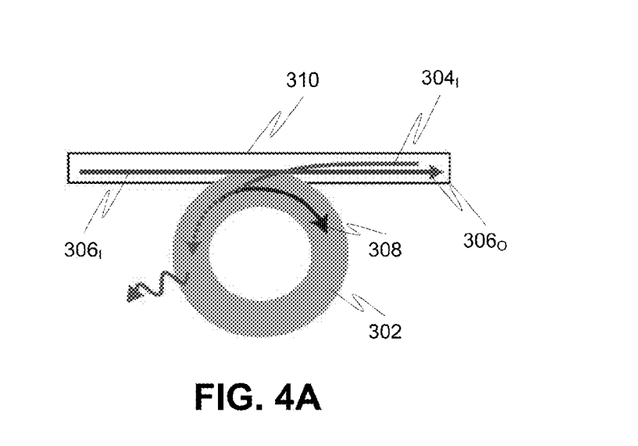
FIG. 4A illustrates aspects of the optomechanically induced non-reciprocity of a micro-ring resonator acting as an optical isolator, according to one or more embodiments of the disclosed subject matter.

Therefore, this configuration realizes an optical diode, where light passes unaltered in one direction, but is completely absorbed in the other direction, as schematically shown in FIG. 4A. The frequency window over which this isolation is efficient is approximately $G_R^2/\kappa$ in the weak coupling limit (i.e., $G_R \ll \kappa$) and $\kappa$ in the strong coupling limit, where the width of the EIT window is $2G_R$ and exceeds the resonator linewidth.

Figure 6A:
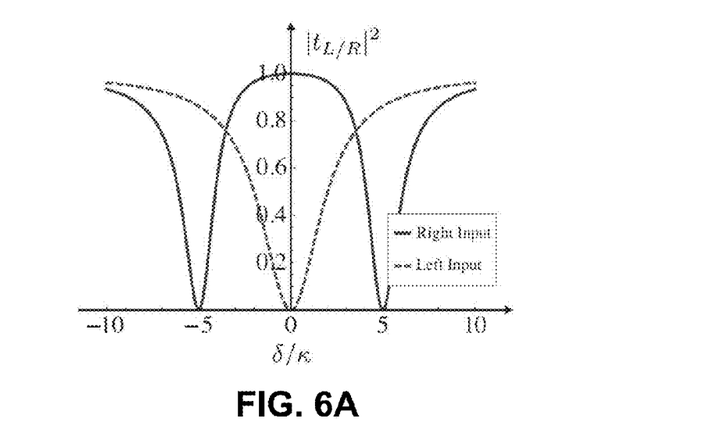
FIG. 6A is a graph of the transmission of an OM system when operated as an optical isolator.

A non-reciprocal transmission spectrum for the strong coupling regime is shown in FIG. 6, which is that of an optical diode for frequencies around $\delta \approx 0$. In particular, FIG. 6 shows the transmission $|t_{R/L}|^2$ of the OM system when operated as an optical isolator (e.g., $\kappa_{in} = \kappa$). Within the resonator bandwidth, the left-moving field is attenuated while the right-moving field is almost completely transmitted. For FIG. 6, $G_R$ has been set as $5\kappa$. In contrast to conventional optical isolation, no magnetic field is applied and instead the optical pump breaks the left-right symmetry.

In an embodiment of the OM system as an optical isolator, the system can be constructed to be in the so-called over-coupled regime where the intrinsic loss is much smaller than the resonator-waveguide coupling (e.g., $\kappa_{in} \ll \kappa$). In this case, the transmittance is close to unity in both directions. However, the left- and right-going fields experience a different dispersion:

$$\begin{pmatrix} f_{R,out}(\delta) \\ f_{L,out}(\delta) \end{pmatrix} \approx \begin{pmatrix} e^{i\theta_R(\delta)} & 0 \\ 0 & e^{i\theta_L(\delta)} \end{pmatrix} \begin{pmatrix} f_{R,in}(\delta) \\ f_{L,in}(\delta) \end{pmatrix} \tag{10}$$

Figure 4B:
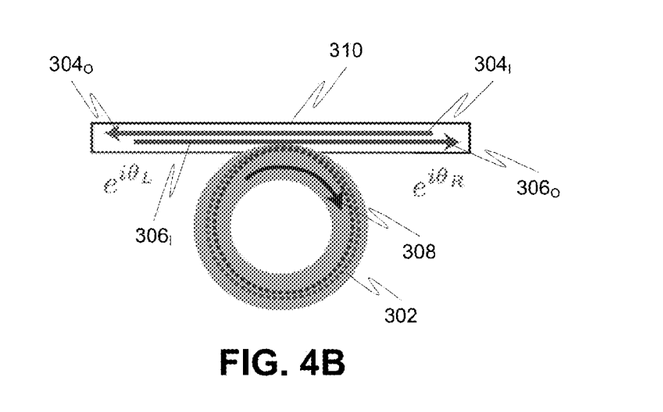
FIG. 4B illustrates aspects of the optomechanically induced non-reciprocity of a micro-ring resonator acting as a phase shifter, according to one or more embodiments of the disclosed subject matter.

In general, the phases $\theta_R$ and $\theta_L$ will be different, and therefore, in this configuration, the OM system acts as a non-reciprocal phase shifter, as schematically shown in FIG. 4B. Again, in contrast to conventional magnetic field induced non-reciprocal phases, e.g., Faraday rotation, the OM system does not require large magnetic fields.

Figure 6B:
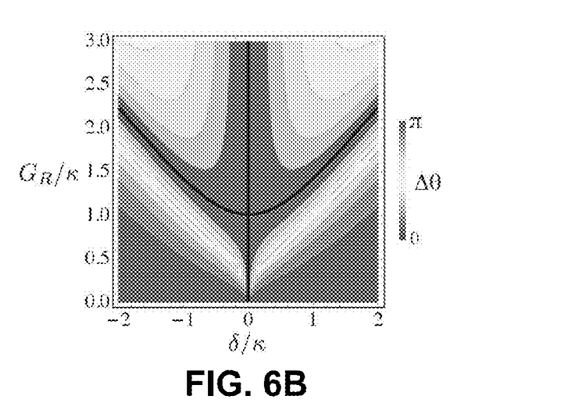
FIG. 6B is a graph of the phase shift of an OM system when operated as a non-reciprocal phase shifter.

FIG. 6B shows the phase effect of the non-reciprocal phase shifter with $\kappa_{in} = 0.01\kappa$ and $\gamma_m = 0$. Both the left and the right input field are almost completely transmitted (i.e., >98%), but acquire different phases, $\Delta\theta = \theta_R - \theta_L$. Solid lines show the location of resonances. As can be seen from FIG. 6B, the OM induced phase difference $|\theta_R - \theta_L|$ can be controlled by changing the pump intensity and can be tuned from zero to about $\pi$ over a large range of frequencies. Therefore, a maximal non-reciprocal phase shift can be readily achieved for light passing through a single device.

Figure 9:
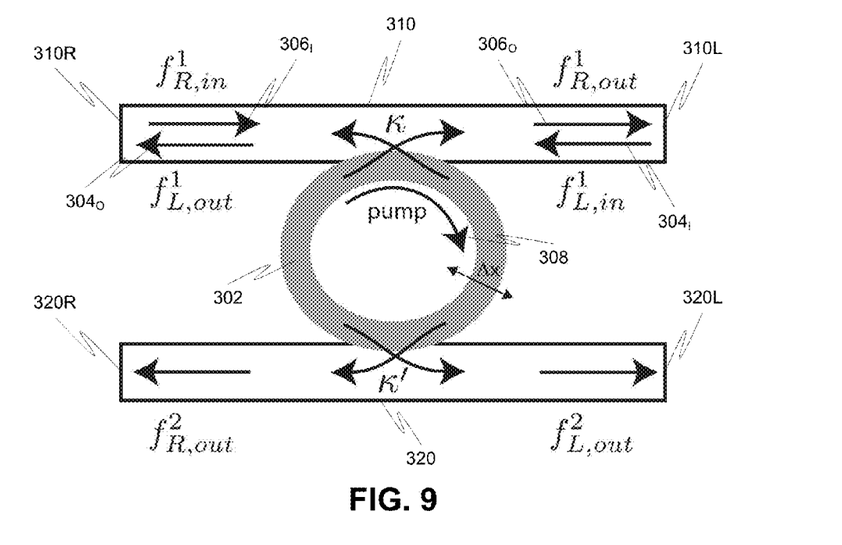
FIG. 9 is a diagram of a general add-drop configuration for a micro-ring resonator that can be employed for non-reciprocal photon routing between waveguides, according to one or more embodiments of the disclosed subject matter.

The general formalism for investigating OM induced non-reciprocity will now be discussed. In particular, the effect of energy non-conserving terms as well as a finite coupling between the left- and right-circulating resonator modes (neglected in the simplified discussion above) are now included. In addition, the discussion has also been extended to a slightly more general configuration of the OM system, as shown in FIG. 9. The OM system of FIG. 9 includes the ring resonator 302 side-coupled to a first optical waveguides 310 with rate $\kappa$ and a second optical waveguide 320 with rate $\kappa'$. For $\kappa' = 0$, this setting reduces to the resonator coupled to a single waveguide case discussed above. Moreover, in an add-drop configuration (e.g., $\kappa'=\kappa, \kappa_{in}\approx 0$), this device can be used for non-reciprocal routing of light. Thus, photons can be routed non-reciprocally between the upper waveguide 310 and the lower waveguide 320.

To account for a more realistic situation the presence of intrinsic defects inside the ring resonator is included in the total Hamiltonian:

$$H = H_{om} + \beta a_L^\dagger a_R + \beta^* a_R^\dagger a_L \qquad (11)$$

In addition to the OM interaction $H_{om}$ given in Eq. (2), the second and third terms in this Hamiltonian represent a coherent scattering of strength $\beta$ between the two degenerate optical modes, which is associated with bulk or surface imperfections. The system dynamics are fully described by the set of quantum Langevin equations (i=L, R):

$$\dot{a}_i(t) = i[H, a_i(t)] - \kappa_t a_i(t) - \sqrt{2\kappa}\, f_{i,in}^1(t) - \sqrt{2\kappa'}\, f_{i,in}^2(t) - \sqrt{2\kappa_{in}}\, f_{i,0}(t) \qquad (12)$$

$$\dot{b}(t) = i[H, b(t)] - \frac{\gamma_m}{2} b(t) - \sqrt{\gamma_m}\, \xi(t) \qquad (13)$$

together with the relations $f_{i,out}^1(t) = f_{i,in}^1(t) + \sqrt{2\kappa} a_i(t)$ and $f_{i,out}^2(t) = f_{i,in}^2(t) \sqrt{2\kappa'} a_i(t)$ between the in- and out-fields. In these equations, $\kappa_t = \kappa + \kappa' + \kappa_{in}$ is the total ring resonator field decay rate and the operators $f_{i,in}^2(t)$ are $\delta$-correlated field operators for the in-fields in the upper and lower waveguide (see FIG. 9) and $f_{i,0}(t)$ is a vacuum noise operator associated with the intrinsic photon loss. Finally, $\gamma_m = \omega_m/Q_m$ is the mechanical damping rate for a quality factor $Q_m$ and $\xi(t)$ is the corresponding noise operator.

In contrast to the optical fields, the mechanical mode is coupled to a reservoir of finite temperature T such that $|\xi(t), \xi^\dagger(t')| = \delta(t-t')$ and $\langle \xi(t)\xi^\dagger(t')\rangle = (N_{th}+1)\delta(t-t')$ where $N_{th}$ is the thermal equilibrium occupation number of the mechanical mode. Note that the Langevin equation for the mechanical mode, Eq. (13), is only valid for $\gamma_m \ll \omega_m$. For typical mechanical quality factors $Q_m \sim 10^4 - 10^5$ this condition is well satisfied. For most of the results discussed below it has been considered that the limit $\gamma_m \to 0$, while keeping a finite thermal heating rate $\gamma_m N_{th} \approx k_B T/(\hbar Q_m)$.

As before, it is assumed that the clockwise mode of the resonator is driven by a strong classical field of frequency $\omega_L = \omega_C + \Delta_0$ and amplitude $\in$. Making the transformation $f_{R,in}(t) \to f_{R,in}(t) + \sqrt{2\kappa}\in$ and writing the average field expectation values in the frame rotating with $\omega_L$ yields:

$$\langle \dot{a}_R \rangle = (i\Delta_0 - ig_0 \langle b + b^\dagger \rangle - \kappa_t)\langle a_R \rangle - i\beta^* \langle a_L \rangle_L - 2\kappa\in \qquad (14)$$

$$\langle \dot{a}_L \rangle = (i\Delta_0 - ig_0 \langle b + b^\dagger \rangle - \kappa_t)\langle a_L \rangle - i\beta \langle a_R \rangle \qquad (15)$$

$$\langle \dot{b} \rangle = -i\omega_m \langle b \rangle - ig_0(|\langle a_R \rangle|^2 + |\langle a_L \rangle|^2) \qquad (16)$$

In the steady-state, $\langle b \rangle = -g_0(|\langle a_R \rangle|^2 + |\langle a_L \rangle|^2)/\omega_m$. By redefining the detuning to absorb the OM shift, $\Delta = \Delta_O + 2g_0^2(|\langle a_R \rangle|^2 + |\langle a_L \rangle|^2)/\omega_m$, the optical field equations in the steady state can be rewritten as:

$$0 = (i\Delta - \kappa_t)\langle a_R \rangle - i\beta^* \langle a_L \rangle - 2\kappa\in \qquad (17)$$

$$0 = (i\Delta - \kappa_t)\langle a_L \rangle - i\beta \langle a_R \rangle \qquad (18)$$

In the absence of mode coupling (i.e., $\beta=0$), the counter clockwise mode remains empty (i.e., $\langle a_L \rangle = 0$, resulting in $\langle a_R \rangle = 2\kappa\in/(i\Delta - \kappa_t)$. However, in the presence of mode coupling, the following is obtained:

$$\langle a_R \rangle = \frac{2\kappa(i\Delta - \kappa_t)}{(i\Delta - \kappa_t)^2 + |\beta|^2}\varepsilon, \qquad (19)$$

$$\langle a_L \rangle = \frac{i\beta}{i\Delta - \kappa_t}\langle a_R \rangle$$

In general, both optical modes are excited. By making the unitary transformations $a_i \to a_i + \langle a_i \rangle$ and $b \to b + \langle b \rangle$ and after neglecting terms of $\vartheta(g_0)$, the linearized OM Hamiltonian becomes:

$$H = \omega_m b^\dagger b - \sum_{i=R,L} \Delta a_i^\dagger a_i + \qquad (20)$$

$$\beta a_L^\dagger a_R + \beta^* a_R^\dagger a_L + \sum_{i=R,L} (G_i a_i^\dagger + G_i^* a_i)(b^\dagger + b)$$

where due to the mode coupling, both circulating modes exhibit an enhanced coupling ($G_i = g_0 \alpha_i$) to the mechanical mode. Or primary interest is the case where the resonator is driven near the mechanical red sideband ($\Delta = -\omega_m$), where the terms of the form $a_i^\dagger b^\dagger + a_i b^\dagger$ are dominant. However, small corrections due to the off-resonant couplings $a_i^\dagger b^\dagger + a_i b$ are included in the general formalism.

If the OM field operators are grouped in to a vector, i.e., vector $v(t) = (b(t), a_R(t), a_L(t), b^\dagger(t), a_R^\dagger(t), a_L^\dagger(t))^T$, the equations of motion can be written in the form:

$$\partial_t v(t) = Mv(t) - \sqrt{2\kappa}I^1(t) - \sqrt{2\kappa'}I^2(t) - \sqrt{\gamma_m}I^m(t) \qquad (21)$$

Here the coupling matrix M is given by:

$$M = \qquad (22)$$

$$i\begin{pmatrix} \omega_m - i\gamma_m/2 & G_R^* & G_L^* & 0 & G_R & G_L \\ G_R & -\Delta - i\kappa_t & \beta^* & G_R & 0 & 0 \\ G_L & \beta & -\Delta - i\kappa_t & G_L & 0 & 0 \\ 0 & -G_R^* & -G_L^* & -\omega_m - i\gamma_m/2 & -G_R & -G_L \\ -G_R^* & 0 & 0 & -G_R^* & \Delta - i\kappa_t & -\beta \\ -G_L^* & 0 & 0 & -G_L^* & -\beta^* & \Delta - i\kappa_t \end{pmatrix}$$

and the input field vectors are defined as $I^i(t) = (0, f_{R,in}^i(t), f_{L,in}^i(t), 0, f_{R,in}^{\dagger i}(t), f_{L,in}^{\dagger i}(t))^T$ for i=1, 2 and $I^m(t) = (\xi(t), 0, 0, \xi^\dagger(t), 0, 0)^T$. Note that Eq. (21) omits the contributions from the intrinsic noise operators $f_{i,0}(t)$, which act on the vacuum and therefore do not contribute to the results discussed below. Solving the equations of motion for the OM degrees of freedom (a's and b's) in the Fourier domain yields:

$$\tilde{v}(\omega) = (-M + i\omega II)^{-1}(\sqrt{2\kappa}\tilde{I}^1(\omega) + \sqrt{2\kappa'}\tilde{I}^2(\omega) + \sqrt{\gamma_m}\tilde{I}^m(\omega)) \qquad (23)$$

By defining the output field vector as:

$$\tilde{O}^1(\omega) = (0, \tilde{f}_{R,Out}^1(\omega), \tilde{f}_{L,out}^1(\omega), 0, \tilde{f}_{R,out}^{\dagger 1}(-\omega), \tilde{f}_{L,out}^{\dagger 1}(-\omega))^T, \qquad (24)$$

the input-output relation can be rewritten as:

$$\tilde{O}^1(\omega) = \sqrt{2\kappa}\,\text{diag}(0,1,1,0,1,1)\tilde{v}(\omega) + \tilde{I}^1(\omega). \qquad (25)$$

A similar expression can be derived for the out-fields in the second waveguide $\tilde{O}^2(\omega)$.

Combining Eqs. (23)-(25), the output fields can be evaluated as a function of the input field for arbitrary system parameters. Note that due to the presence of non-resonant OM interactions $\sim (a_i^\dagger b^\dagger + a_i b)$, the scattering matrix mixes the $f_{i,in}$ with the conjugate fields $f_{i,in}^\dagger$. In other words, different quadratures of the input fields have different transmission properties—an effect which is related to OM squeezing. However, as shown further below, for relevant parameter regimes this effect is negligible in the OM system. In the discussion immediately below, only the relevant phase independent part of the scattering matrix has been evaluated.

In the device with four ports (e.g., 310R, 310L, 320R, and 320L) shown in FIG. 9, the various different non-reciprocal effects can be studied. Apart from the optical diode and phase-shifter settings outlined above, the add-drop configuration ($\kappa=\kappa'$, $\kappa_{in}=0$) could be used to realize a non-reciprocal optical router between the two waveguides where, e.g., $f_{R,in}^1 \to f_{R,out}^1$ but $f_{L,in}^1 \to f_{L,out}^2$. However, this situation is formally equivalent to the optical diode by interchanging the role of $\kappa'$ and $\kappa_{in}$. Therefore, the following discussion can be restricted to the transmission amplitudes $t_{R,L}(\omega)$ as defined in the two port scattering matrix in Eq. (7).

Compared to the ideal situation described above, of particular interest here is the OM non-reciprocity in the presence of a finite intrinsic mode coupling, i.e., $\beta \neq 0$, where photons in the left- and right-circulating modes of both the probe and pump field can no longer propagate independently. Such a coupling is found in many experiments with high-Q microresonators and often attributed to bulk or surface imperfections. As noted above, a first consequence of this mode mixing is that the pump field is scattered into the left-circulating mode. Enhanced OM couplings $G_{R,L} \sim \alpha_{R,L}$ are obtained for both propagation directions (see Eq. (19)). For example, for a purely right-going pump field, the intra-resonator fields are given by:

$$\frac{\langle \alpha_R \rangle}{\varepsilon} = \frac{2\kappa(i\Delta - \kappa_t)}{(i\Delta - \kappa_t)^2 + |\beta|^2}, \quad (26)$$

$$\frac{\langle \alpha_L \rangle}{\varepsilon} = \frac{2i\beta\kappa}{|\beta|^2 + (i\Delta - \kappa_t)^2}.$$

Figure 7:
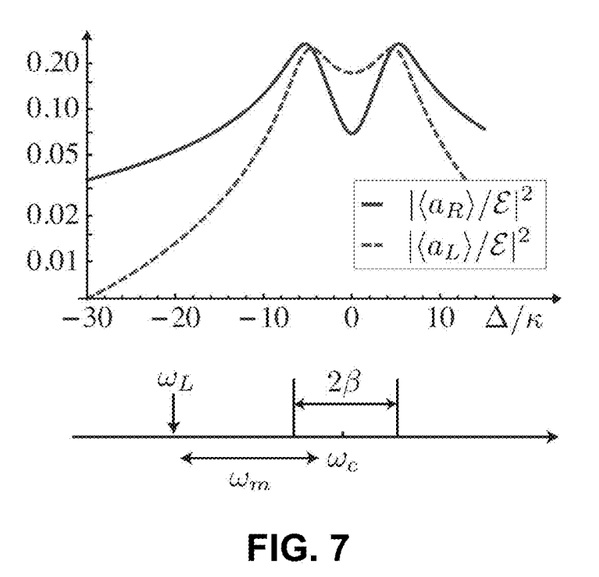
FIG. 7 is graph of the mean photo number in left and right circulating modes in the presence of a finite mode coupling and as a function of pump detuning. The bottom diagram shows the relation between the relevant frequencies in the OM system.

These expressions are plotted in FIG. 7 as a function of the pump detuning $\Delta$ and for the case of large mode coupling ($\beta \gg \kappa_t$). FIG. 7 shows the mean photon number in the left and right circulating modes in the presence of a finite mode coupling $\beta$ and as a function of the pump detuning $\Delta=\omega_L-\omega_C$. For the graph of FIG. 7, it has been assumed that the pump field only drives the right-circulating mode and that the resonator is coupled to a single waveguide (i.e., $\kappa'=0$). The other parameters are $(\beta, \kappa_{in})/\kappa=(4,1)$. At the normal mode frequencies $\omega \approx \pm \beta$, the left- and right-circulating modes are almost equally populated, while everywhere else, there is an intensity imbalance between left- and right-circulating modes. In addition, the diagram at the bottom of FIG. 7 shows the relation between the relevant frequencies in the OM system. In the presence of the mode coupling, the sidebands ($\pm\beta$) are located around the bare resonator frequency $\omega_C$ and the resonator is pumped at the mechanical red sideband. As is evident from the figures, an asymmetric pumping can be achieved either for $\Delta=0$ or $|\Delta| \gg \beta$.

However, to achieve a resonant OM coupling, $\Delta$ should be chosen to be approximately equal to $\omega_m$. Therefore, $|G_L|/|G_R| \sim \beta/\sqrt{\omega_m^2+\kappa^2}$, which means that the parasitic coupling can be suppressed by choosing high frequency mechanical modes. Further, a complete cancellation of $G_L$ could be achieved by adding a second pump beam in the left-circulating direction. In particular, if the strength of the left input pump is chosen as $\in=-i\beta/(i\Delta-\kappa_t)\in$, then $\langle\alpha_R\rangle=2\kappa\in/(i\Delta-\kappa_t)$ and $\langle\alpha_L\rangle=0$. In the following discussion, it will be assumed that that $|G_L|$ is suppressed either by a large detuning or by adding a reverse pumping field to cancel the coupling exactly.

Figure 10A:
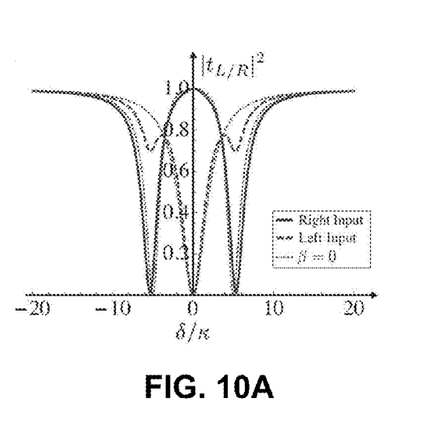
FIG. 10A is a graph of the transmittance for light propagating in a waveguide coupled to a micro-ring resonator in the presence of weak mode mixing.

In addition to pump backscattering, the probe photons are also mixed by the coupling term $\sim \beta$ in Hamiltonian (Eq. (20)) and even for $|G^L| \to 0$ a degradation of the non-reciprocal response of the device will occur. Consider the case of weak mode mixing, $\beta \ll \kappa$, and assume that the OM system is pumped in the right-circulating mode at the OM red sideband ($\Delta=-\omega_m$, $\omega_m \gg \beta$), as indicated the bottom diagram of FIG. 7. In this regime, the rate of backscattering of photons inside the resonator is smaller than the decay rate, and therefore, the non-reciprocal response of the device is qualitatively the same as in the ideal case. This is shown in FIG. 10A where the mode coupling only slightly reduces the operational bandwidth, i.e., $\kappa \to \kappa(1-\beta^2/G_R^2)$. Note that FIG. 10A shows the transmittance for light propagating in a waveguide coupled to a resonator (AFP) in the presence of weak mode mixing ($\beta \gg 2\kappa$) and assuming $(\omega_m, G_R, \kappa_{in}, \gamma_m)/\kappa=(20, 5, 1, 0)$ and $\Delta=-\omega_m$.

Figure 10B:
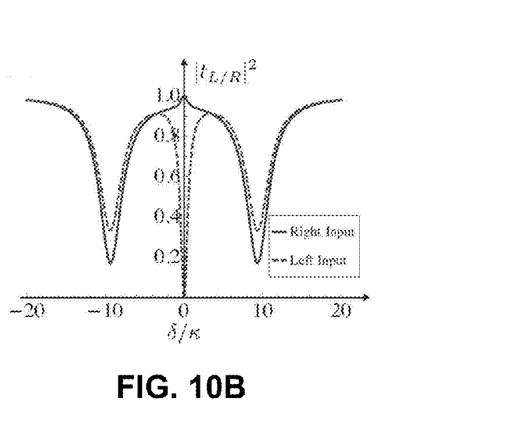
FIG. 10B is a graph of the transmittance for light propagating in a waveguide coupled to a micro-ring resonator in the presence of strong mode mixing.

In contrast, when the mode coupling is strong (e.g., $\beta \gg \kappa$), the backscattering strongly redistributes the probe field in between right- and left-circulating modes. As shown in FIG. 10B, the EIT width and the associated non-reciprocal effects can be significantly reduced. Note that FIG. 10B shows the transmittance for light propagating in a waveguide coupled to a resonator (AFP) in the presence of strong mode mixing ($\beta \gg 8\kappa$) and assuming $(\omega_m, G_R, \kappa_{in}, \gamma_m)/\kappa=(20, 5, 1, 0)$ and $\Delta=-\omega_m$.

Figure 8:
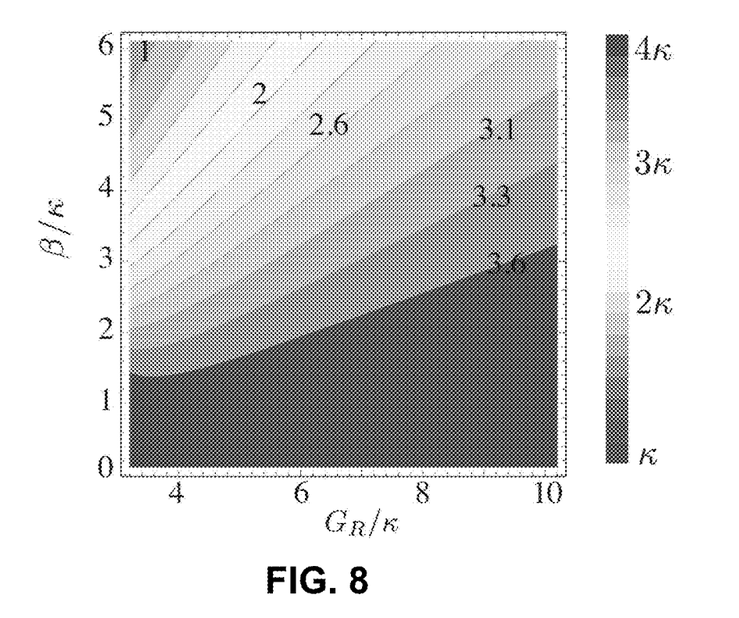
FIG. 8 is graph of operational bandwidth of an optical diode (i.e., optical isolator) in the presence of a finite mode coupling and different values of enhanced OM coupling.

In FIG. 8, the operational bandwidth of an optical diode in the presence of a finite mode coupling $\beta$ and different values of the enhanced OM coupling $|G_R|$ is shown. The graph assumes $G_L=0$ and $(\omega_m, \kappa_{in}, \gamma_m)/\kappa=(20, 1, 0)$, $\Delta=-\omega_m$. In the absence of the mode coupling the bandwidth is $4\kappa$, which for a finite $\beta$ can be recovered by using a strong pump to enhance $G_R$. While the bandwidth decreases with increasing $\beta$, this effect can be compensated by using a stronger pump to achieve $G_R > \beta$. Therefore, the presence of a finite intrinsic mode mixing does not fundamentally limit the operation of the device. Even if this coupling exceeds the ring resonator linewidth, non-reciprocal effects can persist, provided that the OM coupling is sufficiently strong.

To put the above noted results in context with other devices, reference is made to a device where an optical whispering gallery mode inside a toroidal microresonator is coupled to a mechanical mode of frequency $\omega_m/(2\pi)=78$ MHz. In this device, the single-photon OM coupling is $g_O/(2\pi)=3.4$ kHz and the directional enhanced coupling can reach $G/(2\pi)=11.4$ MHz. The resonator decay rate is $\kappa/(2\pi)=7.1$ MHz. Therefore, this device can be operated in the strong coupling regime $|G| > \kappa_t$. Assuming that intrinsic defects can be reduced to a level $|\beta| < |G| \sim 10$ MHz, this device can be used for implementing the different non-reciprocal effects described in this work. In particular, if $\kappa \approx \kappa_{in}$ then the optical isolation can be observed within the resonator bandwidth. OM systems supporting optical whispering gallery modes with mechanical frequencies on the order of GHz have been demonstrated, but further optimization of such devices can achieve non-reciprocal OM effects at a much higher frequencies and push the operational bandwidth of such devices into the 100 MHz regime.

The above discussion has only taken into consideration the scattering relations between the optical in- and out-fields, which due to the linearity of the equations of motion are the same for large classical fields as well as single photons. In practice, additional noise sources will limit the operation of the device to a minimal power level, or equivalently to a minimal number of photons in the probe beams. A fundamental noise source in the OM system stems from the thermal Langevin force $\xi(t)$, which excites the mechanical resonator. The OM coupling up-converts mechanical excitations into optical photons which then appear as noise in the output fields. To estimate the effect of this noise, the contribution of thermal phonons in the noise power of the right moving out-field can be given by:

$$P_{noise} = \hbar \omega_c \times \int_B \frac{d\omega}{2\pi} \langle \tilde{f}_{R,out}^{1\dagger}(\omega) \tilde{f}_{R,out}^1(\omega) \rangle, \quad (27)$$

where B denotes frequency band of interest centered around the optical resonance. Eq. (25) can be used to express $\tilde{f}_{R,out}^1(\omega)$ in terms of the noise operator $\xi(\omega)$. Under the relevant conditions, the following approximate result can be obtained:

$$P_{noise} \cong \qquad (28)$$

$$\hbar \omega_c \int_B \frac{d\omega}{2\pi} \frac{2\gamma_m N_{th} \kappa G_R^2}{G_R^4 - 2G_R^2(\omega - \omega_m)^2 + (\kappa_i^2 + (\omega - \omega_m)^2)(\omega - \omega_m)^2}.$$

As described above, non-reciprocal effects are most effective in a small band around the mechanical frequency. Thus, $B=[\omega_m-\Delta B, \omega_m+\Delta B]$, where $\Delta B \ll \omega_m$, can be set as the operation bandwidth of the device. By assuming that $\Delta B \leq G_R^2/\kappa$ in the weak coupling regime and $\Delta B \leq \kappa$ for strong OM coupling, the following general relation, up to a numerical factor $\vartheta(1)$, is obtained:

$$P_{noise} \approx \hbar \omega_c \times \gamma_m N_{th} \times \frac{\kappa \Delta \beta}{G_R^2}. \qquad (29)$$

For weak coupling and a maximal bandwidth $\Delta B = G_R^2/\kappa$, the noise power is given by the rate $\gamma_m N_{th} \approx k_B T/(\hbar Q_m)$ at which phonons in the mechanical resonator are excited. Thus, if a signal pulse of length $\Delta B^1$ is sent through the device a number $N_{noise} \approx \gamma_m N_{th}/(G_R^2/\kappa)$ of noise photons are generated during this time. Therefore, the condition for achieving non-reciprocal effects on a single photon level, i.e., $N_{noise} < 1$, is equivalent to OM ground state cooling, which is achievable in a cryogenic environment.

Eq. (29) also shows that the thermal noise level can be further reduced in the strong coupling regime. In this case the maximal operation bandwidth is $\Delta B = \kappa$ and the noise power is suppressed by an additional factor $(\kappa/G_R)^2 \ll 1$. This is due to the fact that thermal noise is mainly produced at the two split mode frequencies $\omega_m \pm G_R$, while the non-reciprocal effects rely on the transparency window between those modes. Note that while OM cooling saturates at $G_R \approx \kappa$, the noise suppression in the disclosed device can be improved with increasing ratio $G_R/\kappa$, eventually limited by the onset of the OM instability at $G_R = \omega_m/2$.

The effect of off-resonant OM interactions $\sim(a_i^\dagger b^\dagger + a_i b)$, which lead to a phase sensitive transmission or equivalently, a partial squeezing of light in the output field, is discussed below. For simplicity, the case of a resonator coupled to a single waveguide without mode coupling ($\beta=0$) is considered below. It is assumed that $G_R=G$ and $G_L=0$. In addition, the pump field has been set to the red sideband ($\Delta=-\omega_m$). In such a configuration, the incoming right (left)-going field will exit the system as only right (left)-going field, respectively. The output field in the right-going channel can be given by:

$$\begin{pmatrix} f_{R,out}^1(\omega) \\ f_{R,out}^{1\dagger}(-\omega) \end{pmatrix} = \begin{pmatrix} \alpha(\omega) & \eta(\omega) \\ \eta^*(-\omega) & \alpha^*(-\omega) \end{pmatrix} \begin{pmatrix} f_{R,in}^1(\omega) \\ f_{R,in}^{1\dagger}(-\omega) \end{pmatrix}, \quad (30)$$

where $$\alpha(\omega) = \frac{4|G|^2 \omega_m(\omega_m + i\kappa) - (\omega^2 - \omega_m^2)((\omega + i\kappa_{in})^2 - (\omega_m + i\kappa)^2)}{(4|G|^2 \omega_m^2 + (\omega^2 - \omega_m^2)((\kappa + \kappa_{in} - i\omega)^2 + \omega_m^2))}, \quad (31)$$

and $$\eta(\omega) = \frac{4iG^2 \kappa \omega_m}{(4|G|^2 \omega_m^2 + (\omega^2 - \omega_m^2)((\kappa + \kappa_{in} - i\omega)^2 + \omega_m^2))}. \quad (32)$$

Figure 5:
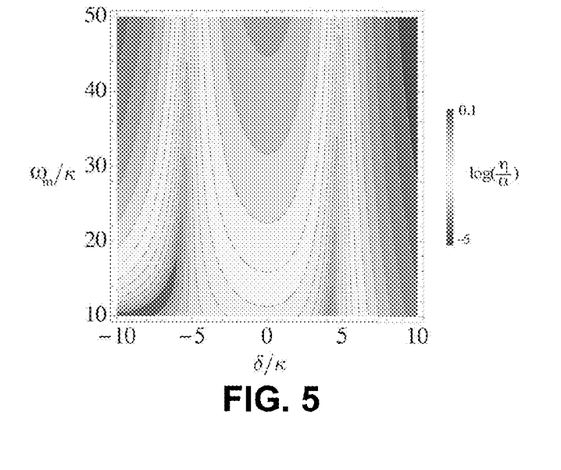
FIG. 5 is a graph of the ratio between phase sensitive squeezing terms and the phase insensitive amplitudes.

The diagonal elements are the phase insensitive transmissions amplitudes, which have been discussed above and which are related to the resonant OM coupling terms. In general, the presence of non-zero off-diagonal terms, $\eta(\omega) \neq 0$, mixes the $f_{in}$ and $f_{in}^\dagger$ components. This implies a different transmission for different quadratures of the probe light, an effect which is exploited for OM squeezing, but is unwanted in the present context. FIG. 5 shows the ratio between phase sensitive squeezing terms $\eta$ and the phase-insensitive transmission amplitudes $\alpha$, assuming that $\Delta=-\omega_m$ and $(G, \kappa_{in}, \gamma_m)/\kappa=(5, 0.5, 0)$. As shown in FIG. 5, these effects are strongly suppressed in the parameter regime of interest. In particular squeezing effects are negligible within the transparency window $|\delta| < G$, where non-reciprocal effects are most pronounced.

Although specific embodiments have been discussed above with respect to optical wavelengths, the teachings of the disclosed subject matter are not limited thereto. Rather, the techniques for optomechanically induced non-reciprocity can be applied to other wavelength regimes, such as, but not limited to, infrared and microwave wavebands in addition to visible light wavebands. In addition, although specific embodiments have been discussed employing a micro-ring resonator, embodiments of the disclosed subject matter are not limited to such a shape or size. Other resonator shapes and sizes are also possible according to one or more embodiments of the disclosed subject matter. For example, the resonator may have a shape, in plan view, of a toroid, a ring-shape with a non-circular cross-section, a racetrack, a disc, or a closed-loop shape. Moreover, although specific materials, sizes, and shapes are discussed herein, other materials, sizes, and shapes are also possible according to one or more contemplated embodiments.

In addition, although specific embodiments have been discussed with respect to on-chip optical devices, the teachings of the present disclosure are not limited thereto. Rather, embodiments of the disclosed subject matter can operate in any electromagnetic domain (e.g., optical, infrared, or microwave frequencies) as well as on the macroscopic or microscopic scales (e.g., off-chip or on-chip). For example, a non-reciprocal OM resonator according to the teachings of the present disclosure can interact with one or more optical elements or components separate from the resonator, e.g., on a different chip or support structure.

Features of the disclosed embodiments may be combined, rearranged, omitted, etc., within the scope of the invention to produce additional embodiments. Furthermore, certain features may sometimes be used to advantage without a corresponding use of other features.

It is thus apparent that there is provided in accordance with the present disclosure, system, methods, and devices for optomechanically induced non-reciprocity. Many alternatives, modifications, and variations are enabled by the present disclosure. While specific embodiments have been shown and described in detail to illustrate the application of the principles of the present invention, it will be understood that the invention may be embodied otherwise without departing from such principles. Accordingly, Applicants intend to embrace all such alternatives, modifications, equivalents, and variations that are within the spirit and scope of the present invention.

The invention claimed is:

1. A method of non-reciprocal operation of a resonator system, the method comprising:

pumping a resonator with a pumping electromagnetic field in one of a clockwise direction and a counter-clockwise direction of the resonator so as to enhance an optomechanical coupling of the resonator, the resonator having an intrinsic loss, $\kappa_{in}$, at a same time as the pumping, propagating a first input electromagnetic field along a waveguide in a first longitudinal direction thereof, the waveguide being coupled to the resonator such that electromagnetic fields propagating in the waveguide interact with the resonator, the coupling between the waveguide and the resonator being given by $\kappa$, wherein $\kappa$ and $\kappa_{in}$ are such that interaction between the pumping electromagnetic field and the resonator alters the propagation of the first input electromagnetic field in the first longitudinal direction differently than that of a second input electromagnetic field traveling in an opposite longitudinal direction along said waveguide.

2. The method of claim 1, wherein the first input electromagnetic field propagating in the waveguide is completely attenuated by the interaction with the resonator while the second input electromagnetic field propagating in the waveguide is substantially unaffected by the interaction with the resonator.

3. The method of claim 2, wherein $\kappa$ is substantially equal to $\kappa_{in}$.

4. The method of claim 1, wherein the first and second input electromagnetic fields propagating in the waveguide are phase-shifted by different amounts by the respective interactions with the resonator.

5. The method of claim 4, wherein $\kappa$ is greater than $\kappa_{in}$.

6. The method of claim 1, wherein the resonator has a resonance wavelength, and a wavelength of the first input electromagnetic field is substantially equal to said resonance wavelength.

7. The method of claim 1, wherein the resonator is in the shape of a toroid, ring, racetrack, or disk.

8. The method of claim 1, wherein the first input electromagnetic field has a wavelength in the optical regime.

9. The method of claim 1, wherein the first input electromagnetic field has a wavelength in one of the visible light, infrared, and microwave wavebands.

10. The method of claim 1, further comprising:

altering one of the coupling $\kappa$ and the intrinsic loss $\kappa_{in}$ from an initial value to a different value, wherein altering the coupling $\kappa$ includes dynamically adjusting a gap between the waveguide and the resonator, and altering the intrinsic loss $\kappa_{in}$ includes dynamically injecting carriers into the resonator.

11. The method of claim 1, wherein the pumping and propagating are performed at a first time; and further comprising, at a time different than the first time, propagating a third input electromagnetic field along the waveguide in the first longitudinal direction thereof without said pumping the resonator, such that the third electromagnetic field is unaltered by interaction with the resonator.

12. The method of claim 1, wherein the first input electromagnetic field is a single photon.

* * * * *